United States Patent [19]

Raz

[11] 4,161,881
[45] Jul. 24, 1979

[54] HAND SHOWER AND TEMPERATURE INDICATING UNIT

[76] Inventor: Zeev Raz, 17 Keren Hayessod Str., Beer-Sheva, Israel

[21] Appl. No.: 823,558

[22] Filed: Aug. 11, 1977

Related U.S. Application Data

[63] Continuation-in-part of Ser. No. 726,099, Sep. 24, 1976, abandoned.

[30] Foreign Application Priority Data

Oct. 27, 1975 [IL] Israel ........................ 48730

[51] Int. Cl.² ............................................ G01K 13/02
[52] U.S. Cl. .................................... 73/343 R; 73/349
[58] Field of Search ............... 73/343 R, 349; 239/588

[56] References Cited

U.S. PATENT DOCUMENTS

| | | | |
|---|---|---|---|
| 2,112,648 | 3/1938 | Brown | 73/343 R |
| 2,171,992 | 9/1939 | Rantine | 73/343 R |
| 2,626,524 | 1/1953 | Harman | 73/349 |
| 2,645,116 | 7/1953 | Baxter | 73/343 R |
| 3,581,568 | 6/1971 | Pfefer | 73/343 R |
| 3,635,086 | 1/1972 | Beruck | 73/343 R |
| 3,637,143 | 1/1972 | Shames | 239/588 |
| 3,960,016 | 6/1976 | Symmons | 73/343 R |

Primary Examiner—S. Clement Swisher
Assistant Examiner—Denis E. Corr
Attorney, Agent, or Firm—Lawrence Rosen; E. Janet Berry

[57] ABSTRACT

A hand shower and temperature indicating unit is provided. The unit includes a shower head consisting of a water chamber having a perforated water outlet surface and a temperature sensitive means positioned inside the chamber adjacent the opposite surface of the chamber and a rigid conduit section serving as the handle for the unit and integrally attached at one end thereof to the side surface of the chamber. The conduit section has at one end means adapted to direct a water flow towards the temperature sensitive means and has at the free end thereof means for attachment to a water supply line. The unit further includes a temperature indicating means positioned within a recess provided in the outer surface of the unit and operationally attached via a wall of the chamber to the temperature sensitive means to indicate the temperature of the water within the chamber.

8 Claims, 4 Drawing Figures

HAND SHOWER AND TEMPERATURE INDICATING UNIT

This application is a continuation-in-part of an application entitled Temperature Indicating Water Outlet Ser. No. 726,099 filed Sept. 24, 1976, now abandoned.

The present invention relates to hand shower units and more particularly to a hand shower unit having a temperature indicating means integrally attached thereto.

The problem of temperature regulation of hot water in hand shower units is a long recognized one, for which there heretofor has not been provided any satisfactory simple mechanical solution. It is generally known that sensitivity to temperature is subjective to each individual and therefore, for example, adults often encounter difficulty in regulating and adjusting water temperature to be suitable for washing babies, young children or elderly people.

Another difficulty, often encountered by people preparing or regulating water for baths or showers using a hand shower unit is that the temperature of the incoming water can fluctuate through wide extremes of temperatures when supplied by a boiler system for a period of time.

It is therefore a broad object of the invention to provide accurate means by which the actual temperature of water flowing out of a hand shower unit can be constantly monitored and determined and whereby, accordingly, the temperature of the water can be adjusted to the desired temperature. A more specific object is to provide a hand shower unit with a built-in temperature-sensitive means adapted to indicate the temperature of the water flowing therethrough.

According to the invention there is provided a hand shower and temperature indicating unit comprising:

a shower head consisting of a water chamber having a perforated water outlet surface and a temperature sensitive means positioned inside the chamber adjacent the opposite back surface of said chamber;

a rigid water conduit section serving as the handle for said unit and integrally attached at one end thereof to the side surface of said chamber said conduit section having at said one end means adapted to direct a water flow towards said temperature sensitive means and having at the free end thereof means for attachment to a water supply line; and a temperature indicating means positioned within a recess provided in the outer surface of said unit and being operationally attached via a wall of said chamber to said temperature sensitive means to indicate the temperature of the water within the chamber.

In U.S. Pat. No. 2,112,648 and U.S. Pat. No. 3,635,086 there are described temperature measuring and indicating devices adapted respectively to be attached to a faucet to measure the temperature of fluid discharging therefrom or to be connected in a pipe-line system to measure the temperature of water passing therethrough. Similarly in U.S. Pat. No. 2,171,992 and U.S. Pat. No. 3,960,016 there are described water mixing valves having temperature indicators built therein. Said patents, however, neither teach nor relate to a combined hand shower and temperature regulating unit of the type forming the subject matter of the present invention.

In U.S. Pat. No. 2,645,116 there is described and claimed a specific type of combination bath spray device and temperature indicator, however the unit of the present invention differs from said device with regard to many important characterizing structural features as described hereinafter which are neither taught nor suggested by said patent.

More specifically said patent describes and claims a hollow spray head of yieldable resilient material having a transverse wall adjacent to its inner end terminating in an elongated neck arranged centrally of said wall and having a water inlet opening extending therethrough, the outer end of said neck being connectible to a water hose, a handle comprising a rigid transparent elongated sleeve carried by said head surrounding and spaced from said neck and water hose, said sleeve extending a substantial distance along the water hose and affording between the hose and said sleeve a well of a length and width sufficient to house a thermometer tube, and a spray plate secured at the outer end of the head, said hollow spray head including a chamber between the spray plate and the water inlet opening and said transverse wall having an enlargement projecting into said chamber with a thermometer-receiving opening extending through said enlargement and transverse wall whereby a thermometer may be located with its bulb in said chamber and its tube arranged in said well between said water hose and said elongated sleeve and parallel thereto.

As will be realized from said description and as stated specifically in said patent the device does not comprise an integral water conduit which serves as the handle for the device and which is adapted to be simply attached to a water supply line as in the self-contained unit of the present invention and instead requires a complicated assembly of parts involving passing a water hose through an elongated hollow transparent sleeve which serves as handle for the device and then attaching said water hose to the neck of the spray head followed by further complicated assembly steps.

In addition, as described, said device comprises a hollow spray head to which a rigid transparent elongated sleeve is attached to act as handle wherein said sleeve is of sufficient diameter to concentrically surround a standard water hose while leaving sufficient clearance for the thermometer tube to be positioned inside said hollow sleeve between the inner wall thereof and the outer wall of said water hose.

This construction results in a handle of unnecessary and cumbersome thickness which is consequently uncomfortable for easy grasping in use as a hand shower for which it is purportedly designed and in the sleeve of which dirt and bacteria tend to accumulate.

Furthermore since said shower head is constructed with its water inlet opening opposite its spray plate and with the temperature sensitive bulb of the thermometer positioned therebetween when the shower head is operated at low pressure, as is often the case when bathing infants, the water emerging from the water inlet impinges on the thermometer bulb and is deflected therefrom thereby causing an uneven spray of water through said spray plate due to the interference of said thermometer bulb with the direction of water flow and spray pattern.

These and other disadvantages of the prior art devices are overcome by the novel hand shower unit of the present invention as described hereinafter.

While the invention will now be described in connection with certain preferred embodiments with reference to the following illustrative figures so that it may be more fully understood, it is stressed that the particulars shown and described are by way of example and for purposes of illustrative discussion only and are presented in the cause of providing what is believed to be the most useful and readily understood description of the principles and conceptual aspects of the invention. In this regard no attempt is made to show structural details of the hand shower and its constituent parts in more detail than is necessary for a fundamental understanding of the invention, the description taken with the drawings making apparent to those skilled in the art how the several forms of the invention may be embodied in practice.

Figure 1:
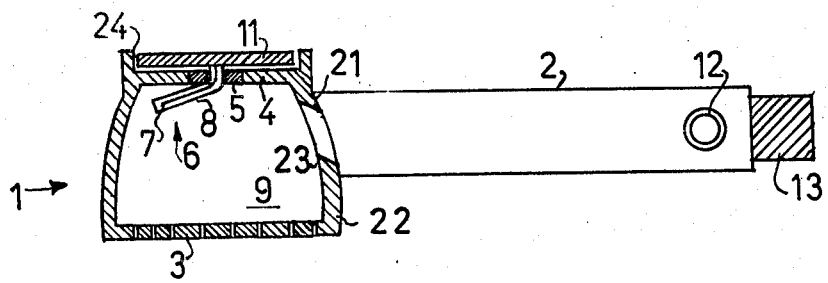
FIG. 1 shows a hand shower unit, partly in cross-section, constructed in accordance with the invention.
Figure 2:
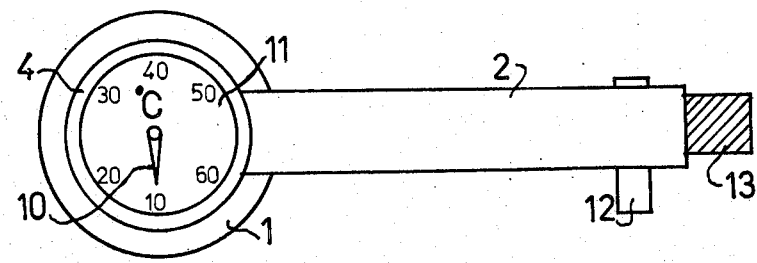
FIG. 2 is a plane view of the unit of FIG. 1 showing one preferred type of indicating means.

Referring first to FIGS. 1 and 2, there is shown a hand shower and temperature indicating unit according to the present invention comprising a shower head 1 affixed to a rigid water conduit section 2. The shower head includes a perforated surface 3 and a back surface 4 on which there is mounted by means of a water-tight sealing element 5, a temperature sensitive means 6, e.g. a thermometer. The thermometer 6 having a bimetallic element 7 encased in column 8, extends into the water chamber 9 of the shower head, and is adapted to rotate a temperature indicating marker 10 pivotally mounted above a calibrated scale 11 (see FIG. 2).

The conduit section 2 may advantageously be provided with a push-button water cut-off member 12, and preferably has a screw threaded end portion 13 for facilitating its attachment to a water hose or pipe (not shown).

Said push-button water cut-off member 12 is especially preferred since it adds to the temperature sensing structure of the unit the additional function of enabling the momentary cessation of flow through said unit whereafter said unit can be dipped into a filled or filling bath tub to provide information with regard to the composite temperature of the water in the bath being filled, which composite water temperature will generally vary from the temperature of the water flowing through said unit at any given time.

As will be noted said rigid water conduit section 2 is adapted to serve as the handle for said unit and is integrally attached at one end thereof 21 to the side surface 22 of said chamber 9 at a position between the temperature sensitive means 6 and the perforated surface 3. Said conduit section has at said one end 21 means which in the present embodiment constitute at upwardly angled outlet portion 23, adapted to direct a water flow towards said temperature sensitive means 6. Furthermore said conduit section and said shower head being preferably of non-transparent material can be colored to match the decor of the bathroom in which the unit is to be installed. Alternatively both of said unit parts can be made of metal such as aluminum, nickel or even gold-plated metal.

As will be realized the positioning of the temperature sensitive means 6 inside the chamber 9 adjacent the back surface 4 thereof assure that said means does not interfere with the flow of water or block any of the shower spray holes in perforated surface 3.

Furthermore the fact that the shower head 1 and conduit section 2 form an integral unit adaped to be attached at end portion 13 to an external water hose provides for ease of installation and use as well as for the provision of a compact and comfortably holdable unit.

Furthermore, as will be noted the temperature indicating means 10, 11 are conveniently positioned within a recess 24 provided on the back 4 of said chamber and are operationally attached by means of water tight sealing element 5 via said wall 4 of said chamber 9 to said temperature sensitive means 7, 8 to indicate the temperature of the water within the chamber.

Figure 3:
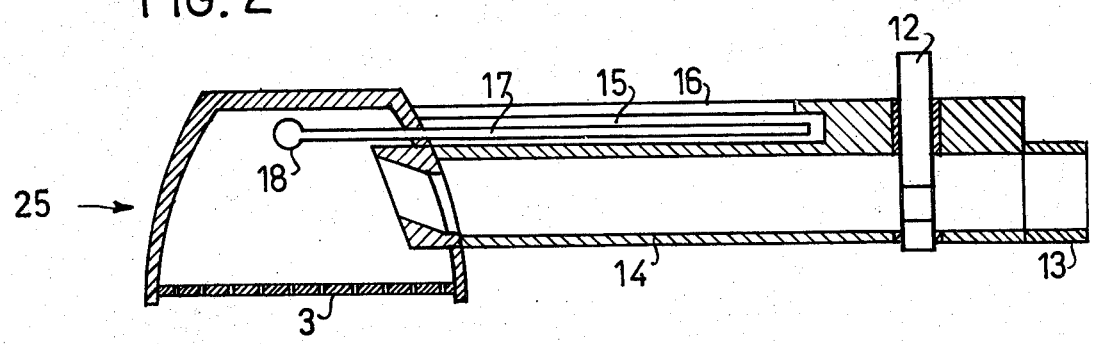
FIG. 3 is a cross-sectional view of a different embodiment of a hand shower unit according to the invention.
Figure 4:
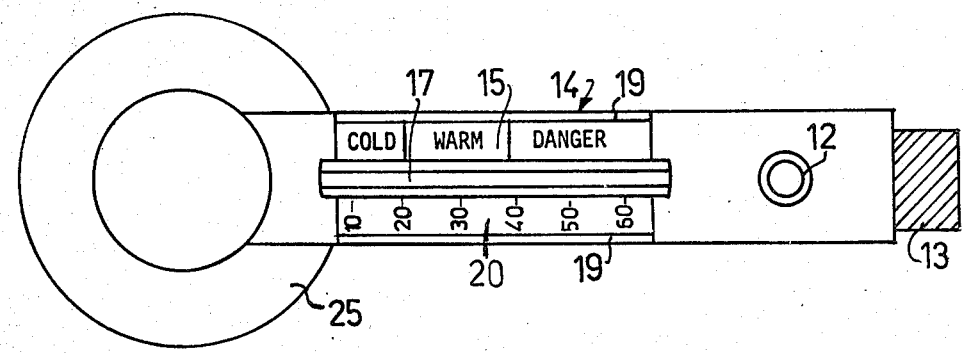
FIG. 4 is a plane view of the hand shower unit of FIG. 3 showing another preferred indicating means.

Turning now to FIGS. 3 and 4, where a different embodiment of the unit according to the invention is shown, it is seen that there is attached to the shower head 25 a rigid water conduit section 14 having a walled recess 15 extending along at least a portion of the back outer surface thereof. The recess 15 may optionally be fitted with a water-tight transparent cover 16 and is adapted to house a thermometer column 17 having a liquid reservoir bulb 18 extending into the shower head in a direction substantially parallel to the perforated water outlet surface 3 of said shower head.

It should be noted that even when said recess 15 is provided along the outer surface of said conduit 14, as opposed to being provided in the back of the shower head, said walled recess does not appreciably increase the circumference of the handle since the additional area occupied by the projecting walls 19 surrounding and forming said recess 15 extends only in one direction from the conduit and does not involve a corresponding increase in area along the sides and bottom thereof.

As can be seen in FIG. 4, underneath the thermometer 17 on the bottom of recess 15, there is placed a calibrated temperature read-out scale 20 for providing the exact temperature of the water flowing through said shower head. Naturally, the thermometer column itself may be provided with such a scale and transparent cover 16 eliminated for easier cleaning maintenance of the unit. Alternatively temperature indicating data may be engraved or otherwise indicated on a provided transparent cover or on the conduit section itself.

While particular embodiments of this invention have been described it will be evident to those skilled in the art that the present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A hand shower and temperature indicating unit comprising:

a shower head consisting of a water chamber having a perforated water outlet surface and a temperature sensitive means positioned inside the rear of the chamber in close proximity to the opposite back surface of said chamber;

a rigid water conduit section serving as the handle for said unit and integrally attached at one end thereof to the side surface of said chamber at a position between said temperature sensitive means and said perforated water outlet surfaces, said conduit section having at said one end means adapted to direct a water flow towards said temperature sensitive means away from said perforated water outlet surface and having at the free end thereof means for attachment to a water supply line; and a temperature indicating means positioned within a recess provided in the outer surface of said unit opposite to said perforated water outlet surface and being operationally attached via a wall of said chamber to said temperature sensitive means to indicate the temperature of the water within the chamber.

2. The unit as claimed in claim 1, wherein the temperature sensitive means is a liquid thermometer.

3. The unit as claimed in claim 1 wherein at least a portion of said temperature sensitive means is positioned inside said chamber and said temperature indicating means includes a calibrated scale affixed to the outer surface of said unit.

4. The unit as claimed in claim 1 wherein at least a portion of said temperature sensitive means extends in a direction substantially parallel to the perforated water outlet surface of said chamber.

5. The unit as claimed in claim 1 wherein said temperature indicating means are positioned in a recess provided in the outer surface of the back of said shower head.

6. The unit as claimed in claim 1 wherein said temperature indicating means are positioned in a walled recess provided in the back outer surface of said water conduit section.

7. The unit as claimed in claim 1 further comprising a push button flow cut-off means.

8. The unit as claimed in claim 1 wherein said conduit section is provided at said one end with an end portion inside said chamber adapted to direct a water flow towards said temperature sensitive means away from said perforated water outlet surface.

* * * * *